Sept. 2, 1969          K. ROLLIG          3,465,185
ELECTRIC MOTOR DRIVE FOR TWO WINDING SHAFTS
Filed Feb. 3, 1966
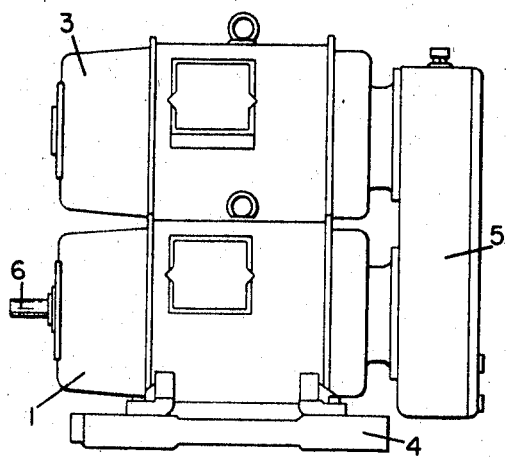
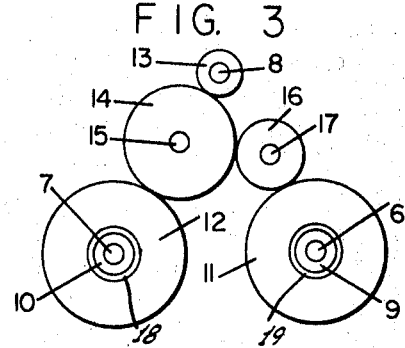
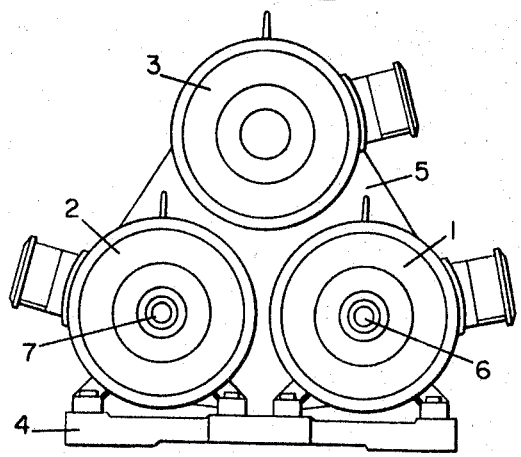
INVENTOR
Karl Rollig United States Patent Office 3,465,185
Patented Sept. 2, 1969

3,465,185
ELECTRIC MOTOR DRIVE FOR TWO WINDING SHAFTS
Karl Rollig, Binningen, Switzerland, assignor to Dr. C. Schachenmann & Co., Basel, Switzerland
Filed Feb. 3, 1966, Ser. No. 525,800
Int. Cl. H02k *7/116, 7/20*
U.S. Cl. 310—112                                   5 Claims

ABSTRACT OF THE DISCLOSURE

A drive arrangement for winding up a long flexible element on a pair of winding shafts which are respectively adapted to be driven from a pair of main motors and in which a third motor is automatically connected over reduction gearing to the respective winding shaft when, due to the increase of the diameter of the roll wound thereon, the driving torque increases.

---

This invention relates to an electric motor drive for two winding shafts which alternately wind continuous lengths of material, the said drive being provided with a third motor in addition to the two main motors, each of which drives a winding shaft, the third motor taking over the winding operation from one or the other of the main motors when a mean roll diameter has been built up, and continues winding via a reduction gear until the roll has acquired its final diameter.

The invention is diagrammatically illustrated by way of example in the accompanying drawings in which:

FIG. 1 is a side view of the trimotor drive;
FIG. 2 is a view from the winding shaft side, and
FIG. 3 is a diagram of the connecting system between the shafts.

The reference numbers 1 and 2 refer to the main motors and the reference number 3 refers to the third motor. The two main motors are disposed on a base plate 4 and a gear housing 5 is flanged to the bearing shields on the side away from the shafts. The third motor 3 is mounted on the gear housing and is supported by it.

The shafts of all three motors, that is to say, shaft 6 of the motor 1, shaft 7 of the motor 2 and shaft 8 of the motor 3 extend into the gear housing 5. The two shafts 6, 7 of the main motors are also provided with butt ends at their drive ends from which the winding shafts are driven, for example, via a V-belt, which is not shown in the drawings.

Hubs 9 and 10 are keyed rigidly to the shafts 6 and 7 and gear wheels 11 and 12 are freely mounted on the said shafts, for example, on ball bearings. Free wheel devices are disposed between hubs and gear wheels in a known manner so that gear wheel and hub form an overrunning clutch 18, respectively 19.

A pinion 13 is keyed to shaft 8 of motor 3 and drives a gear wheel 14. This gear wheel is freely mounted on a stationary pin 15 and transmits the rotation of the pinion 13 to the gear wheel 12. It also transmits the rotation of the pinion 13 to the gear wheel 11 via an intermediate wheel 16 which is freely mounted on a stationary pin 17.

The pinion 13 is smaller in diameter than the two gear wheels 11 and 12, which are of equal size, and thus reduction gears having the same transmission ratio are established between the shafts 8 and 6 through the wheels 13, 14, 16 and 11, and the shafts 8 and 7 through the wheels 13, 14 and 12.

When the pinion 13 rotates in a clockwise direction, the gear wheel 11 rotates counterclockwise and the gear wheel 12 clockwise. Thus, when the free wheel devices disposed between the gear wheels and the hubs thereof are adjusted in a manner such that clamping occurs in a clockwise direction through the gear wheels when the shafts 6 and 7 overrun, the motor 3 can drive the shaft 7 when it rotates in a clockwise direction and the shaft 6 when it reverses its direction of rotation.

The function of drive arrangement of the invention is described in the following, taking into account the clamping action of the overrunning clutches 18 and 19 described above.

It is assumed that winding takes place in a clockwise direction, which means that the shafts 6 and 7 rotate only in this direction in order to drive the two winding shafts.

It is further assumed that the continuous length of material to be rolled up is conducted to the winding positions at a constant speed, and that when the speed of the three motors is changed they have the capacity to develop torque in inverse ratio to the said speed, as is the case, for example, with direct-current shunt motors when they are field-regulated. It is for this reason that motors of this kind are used in the drive arrangement of the present invention.

When the main motor 1 runs with a maximum reduction in excitation, that is to say, at its maximum speed at a given armature voltage, it allows the material to be wound, for example, a paper web, to position itself snugly round the winding shaft, and to be wound under a tension which is a function of the torque of the motor and the diameter of the roll of paper forming on the winding shaft. The diameter of the roll then begins to increase steadily, the speed of the motor 1 being reduced in inverse ratio to the diameter of the roll, this being effected by known means, for example, by keeping the armature at a constant voltage and increasing the strength of the field. However, the torque increases as the diameter of the roll increases, thus maintaining the tension in the length of paper. During this continuous process, the motor 3 rotates counterclockwise at maximum speed corresponding to maximum weakening of the field. It is, in fact, running freely, because no load can be transmitted by gear wheel 12, which is running counter to the direction in which clamping occurs, or by gear wheel 11, which, although it is rotating in the direction in which clamping occurs, is overrun by the hub 9. Overrunning takes place due to the reduction ratio between the gear wheel 11 and the pinion 13. It ceases immediately when the speed of the motor 1 in this ratio drops below the maximum speed, provided, of course, that the motors are the same and that the field is weakened to the same degree.

Given a ratio of 1:3 and a maximum motor speed of 3,000 r.p.m., overrunning in the clutch 19 ceases at the moment the speed of the motor 1 drops to 1,000 r.p.m. At this point the diameter of the roll is three times that of the winding shaft.

At this juncture, the main motor 1, which in this phase of the winding process advantageously operates with its field at full excitation, can be switched off. Takeover by the motor 3 proceeds without any jerking because at this juncture the motor 3 transmits the same torque to the shaft 6 as the motor 1 shortly before the latter is switched off, this being effected by the reduction gear 13–14–16–11 and the overrunning clutch 19.

Winding of the paper web then continues on the same principle as applied to the motor 1 until the diameter of the roll has again increased threefold and thus has a diameter nine times greater than that of the winding shaft, because the field of the motor 3 is at the full state of excitation and no further reduction in speed can take place.

As can be seen, the diameter at which the motor 3 takes over the winding operation is the geometric mean between the initial diameter of the roll and the final diameter. The reduction ratio or the design of the motors may also be such that the switchover takes place at a diameter deviating from this value; however, it is nevertheless termed the "mean diameter."

The foregoing also applies to the second winding shaft which is driven by the main motor 2 and its shaft 7; in this case, however, the motor 3 runs in a clockwise direction. Thus, if the third motor is to drive the shaft 6 and subsequently the shaft 7 in order to continue and finish off the winding operation, its direction of rotation must be changed; however, this can be done only when two overrunning clutches are used as switch members.

Ohter embodiments of the invention are also possible. For example, two electromagnetic clutches (friction or toothed clutches) can be used which connect the third motor selectively with one or other of the winding shafts. In such embodiments it is not necessary to change the direction of rotation.

The use of two electric motors for driving a single winding shaft is generally known. One motor commences the winding operation and continues it until the motor has reached the limit to which it can be regulated, in other words, up to the mean roll diameter, whereupon the second motor continues the process via a reduction gear to its conclusion.

If such an arrangement were to be used for two winding shafts—which are always required when material is to be wound up continuously—a fourth motor would be needed, plus the apparatus necessary to regulate it, as opposed to the three motors used in this invention. This invention thus has considerable advantages to offer in respect of price and weight.

The use of two electric motors to drive two winding shafts in continuously operating plant is described, for example, in German patent specification No. 1,141,153. The first of the two motors commences the winding operation selectively with one or other of the winding shafts, and the second motor takes over winding at the mean roll diameter and continues the operation to its conclusion.

However, there is a serious drawback associated with this system. The switchover from one winding shaft to the other can be effected only after the mean roll diameter has been exceeded, that is to say, after the latter has acquired a magnitude three times greater than the diameter of the winding shaft; it is only at this juncture that the fast-running first motor is freed for acceleration of the new winding shaft, whereby rolling up continues on the other shaft via the second motor and the reduction gear.

It appears to be essential that the switchover from one winding shaft to the other be effected at an earlier stage, that is to say, when the diameter is twice to two and a half times the magnitude of the diameter of the winding shaft, for example, when reject material has been wound up.

This drawback is obviated by this invention. Its second main motor is available at all times to drive the new winding shaft so that the switchover may be effected at any desired time.

Furthermore, the known two-motor drive requires an expensive gear system with four clutches. Notwithstanding its third motor, this invention is more economical because of the simplicity of its gear system which is in one plane. If necessary, the gear wheels described in the foregoing example could be replaced by open pulley wheels round which flat belts or double-tooth belts are disposed in a manner ensuring rotation in the appropriate direction.

Having thus described my invention and the advantages thereof, I do not wish to be limited to the details herein disclosed, otherwise than as set forth in the claims, but what I claim is:

1. A drive arrangement for two winding shafts used for winding up a long flexible element comprising, in combination, a pair of main motors having each an output shaft, each rotated by its motor in one direction, said output shafts being adapted to be respectively connected to said winding shafts for rotating the latter; a reversible third motor having an output shaft adapted to rotate in said one direction and upon reversing of said third motor in the opposite direction; first reduction gear train means between said output shaft of said third motor and the output shaft of one of said main motors and including a gear freely running on said output shaft of said one main motor and being driven in said one direction when said output shaft of said third motor rotates in said one direction; second reduction gear train means between said output shaft of said third motor and the output shaft of the other of said main motors and including a gear freely rotatable on said output shaft of said other main motor and being driven in said one direction when said third motor is reversed and said output shaft of said third motor is rotated in said opposite direction; and means between each of the output shafts of said main motors and the respective gears thereon for automatically connecting the gear to the respective output shaft when the shaft rotates in the same direction as the gear thereon but at a slower speed than the latter.

2. A drive arrangement defined in claim 1, wherein said connecting means between each output shaft of said main motors and the respective gear thereon comprises an overrunning clutch.

3. A drive arrangement as defined in claim 1, wherein each of said main motors is a field regulated direct-current motor.

4. A drive arrangement as defined in claim 1, and including a base and a housing enclosing said gear train means, said main motors being mounted on said base and said third motor being supported by said housing above said main motors.

5. A drive arrangement as defined in claim 1, wherein said first gear train means comprises, in addition to said one gear on the output shaft of said one main motor, a pinion on said output shaft of said third motor and an idler gear meshing with said pinion and said one gear, and wherein said second gear train means comprises a second idler gear meshing with said one idler gear and said gear on the output shaft of the other main motor.

References Cited

UNITED STATES PATENTS

| | | | |
|---|---|---|---|
| 2,356,590 | 8/1944 | Jacobsen | 74—661 |
| 2,666,863 | 1/1954 | Davis | 310—112 |

WARREN E. RAY, Primary Examiner

R. SKUDY, Assistant Examiner

U.S. Cl. X.R.

310—83